United States Patent [19]
Wivagg

[11] Patent Number: 6,047,037
[45] Date of Patent: Apr. 4, 2000

[54] MULTI-LIFT TOOL AND METHOD FOR MOVING CONTROL RODS IN A NUCLEAR REACTOR

[75] Inventor: Adrian Peter Wivagg, Tolland, Conn.

[73] Assignee: Combustion Engineering, Inc., Windsor, Conn.

[21] Appl. No.: 08/871,031

[22] Filed: May 19, 1997

[51] Int. Cl.[7] .................................................. G21C 19/10
[52] U.S. Cl. .......................................... 376/260; 376/262
[58] Field of Search .................................. 376/260, 261, 376/262

[56] References Cited

U.S. PATENT DOCUMENTS

| | | | |
|---|---|---|---|
| 5,331,675 | 7/1994 | Hosoya et al. | 376/260 |
| 5,377,239 | 12/1994 | Nopwaskey et al. | 376/262 |
| 5,570,399 | 10/1996 | Sakamaki | 376/262 |

FOREIGN PATENT DOCUMENTS

| | | | |
|---|---|---|---|
| 60-39834 | 11/1985 | Japan | 376/262 |
| 63-295996 | 12/1988 | Japan | 376/262 |

*Primary Examiner*—Daniel D. Wasil
*Attorney, Agent, or Firm*—Rader, Fishman & Grauer; Ronald P. Kananen

[57] ABSTRACT

A multi-lift tool and method for moving control rod assemblies in a nuclear reactor. The multi-lift tool comprises a frame having an upper end and a lower end. A control rod grapple is supported by the frame for engaging a lifting handle of a control rod. The control rod grapple is movable along a length of the frame for raising and lowering the control rod relative to the frame. A fuel support piece grapple is secured to the lower end of the frame for engaging and lifting a fuel support piece together with the control rod. A blade guide grapple is secured to the upper end of the frame for engaging and lifting a blade guide together with the fuel support piece and the control rod. An unlatching grapple is supported near the lower end of the frame for engaging and lifting an unlatching handle of the control rod. The unlatching grapple is movable along a length of a lower portion of the frame for raising the unlatching handle of the control rod relative to the frame. The fuel support piece grapple has a pair of tapered members with movable latches for inserting into respective first and second holes of the fuel support piece. The multi-lift tool according to the present invention combines several operations into one and thereby reduces the number of steps required to shuffle or exchange control rods in a boiling water nuclear reactor.

17 Claims, 13 Drawing Sheets

MULTI-LIFT TOOL AND METHOD FOR MOVING CONTROL RODS IN A NUCLEAR REACTOR

BACKGROUND OF THE INVENTION

1. Field of the Invention

The present invention relates generally to tools for use in nuclear reactor facilities and, in particular, to a tool and method for exchanging and shuffling control rods in a boiling water nuclear reactor.

2. Description of the Prior Art

In boiling water reactors (BWRs) control rods are used to control the reactivity and power output of fuel assemblies. The control rods are used to shut down the reactor and compensate for long term reactivity changes associated with uranium depletion and fission product buildup. The control rods also function to control the power distribution among fuel assemblies. The control rods enter the core of the reactor vessel from the bottom, and their presence in the lower portion of the core helps to balance the reactivity effects of steam voids in the upper portion of the core and thus tends to flatten the axial power distribution.

The basic design of the BWR control rod assembly is shown in FIG. 1. The control rod assembly 20 consists of a cruciform-shaped stainless steel sheath 21 enclosing eighteen to twenty-one absorber rods 22 in each of its four wings. The absorber rods 22 are stainless steel tubes filled with boron carbide powder ($B_4C$) compacted to approximately 65% of theoretical density in which the $B^{10}$ isotope is the primary neutron absorber. The tubes are seal-welded with end plugs on either end. The individual tubes act as pressure vessels to contain the helium gas released by the boron-neutron capture reaction.

A control cell in which the control rod 22 is positioned is shown schematically in FIGS. 2a–c and 3. The control cell includes a control rod guide tube 24, a fuel support piece 25, and fuel assemblies 26. A plurality of the control rod guide tubes 24 are inserted into holes arranged in a grid in the lower core plate 27. Each guide tube 24 is oriented by alignment lugs 28 which fit over the anti-rotation pin 29 in the lower core plate 27. The control rod drive 30 penetrates the reactor pressure vessel bottom head and is latched to a coupling 31 on the lower end of the guide tube 24. The control rod drive piston 32 enters the lower end of the guide tube 24 and is coupled to the control rod 20 with a spud mechanism 33. A velocity limiter 34 is formed at the lower end of the control rod 20. Guide rollers 35 on the velocity limiter 34 bear on the inside wall of the guide tube 24 to give lateral support for the control rod 20.

The fuel support piece 25 rests in the top end of the guide tube 24. The fuel support piece 25 is supported by a 45 degree sealing ring on the top inside diameter of the guide tube 24. The orientation of the fuel support piece 25 is maintained by alignment lugs 28 on one corner which engage the anti-rotation pin 29 in the lower core plate 27. The fuel support piece 25 is cylindrical at its lower end to fit into the guide tube 24. The upper portion of the fuel support piece 25 consists of four lobes which hold the four fuel assemblies 26 of the control cell. Beneath the hole in the upper surface of each lobe is a cast-in flow path which directs coolant flow into the fuel assembly 26. The coolant flow enters through orifices 36 in the outside diameter of the lower portion of the fuel support piece 25, which are aligned with holes in the control rod guide tube 24. The fuel support pieces 25 for peripheral control cells have smaller orifices 36 for the fuel bundle positions that are on the outer row of fuel.

This orificing arrangement makes the peripheral fuel support pieces 25 unique to their location so that they cannot be moved from place to place during control rod change operations. The control rod 20 passes through a cross-shaped hole 37 in the fuel support piece 25.

Also shown in FIG. 3 is a neutron source 38 which occupies a blind corner hole and a bypass flow plug 39 positioned in a through hole adjacent to the fuel support piece 25.

The four fuel assemblies 26 of the control cell are supported by the lobes of the fuel support piece 25 and occupy the corners of the cell leaving a cross-shaped space at the center for the control rod 20. The rollers 35 on the tip of the control rod 20 contact the outer surface of the fuel assembly channel to provide lateral support for the control rod 20 when it is inserted.

In order to replace a control rod 20 according to the conventional procedure, the fuel assemblies 26 and the fuel support piece 25 in its control cell must be removed. The control rod 20 can then be uncoupled from the drive mechanism 30 and removed from above the reactor.

The design life of the control rods 20 requires that the rods be replaced on a regular basis. In addition to replacing the control rods 20, some plants have found it advantageous to extend the life of the control rods 20 by shuffling the control rods 20 between high and low exposure locations in the core in order to equalize the exposure over a larger number of rods. Some reactors have adopted a particular fuel loading scheme, which concentrates the exposure on one group of control rods 20 (e.g., ⅙ of the total number of rods) while keeping the remainder of the control rods in a fully withdrawn position. This loading scheme requires more frequent control rod shuffles in order to equalize exposure among the blades of the control rods.

Movements of fuel assemblies 26, control rods 20, and associated components are accomplished through use of a refueling platform or bridge and its associated hoisting equipment. A conventional arrangement is shown in FIGS. 4a and 4b. The refueling platform 40 spans the reactor vessel 41 and the reactor cavity 42 and the fuel pool 43. The refueling platform 40 is supported at its ends by respective A-frame supports 44 which run on tracks 45 embedded in the floor. A trolley 46 runs across the platform 40 on its upper structure at a level several feet above the tracks 45.

A first main hoist 46a is supported by the trolley 46 and has a lift cable 47a extending therefrom for raising and lowering the fuel assemblies 26 or a blade guide 49, for example. A second hoist 46b is mounted to the frame of the trolley 46 and has a lift cable 47b for raising and lowering the fuel support piece 25, for example. A third hoist 46c is mounted to a monorail extending along the platform 40 and has a lift cable 47c for raising and lowering the control rod 20, for example. The platform 40 and trolley 46 are designed to transport fuel assemblies 26, control rods 20, blade guides 49, fuel support pieces 25, and other contaminated components under water between various points in the reactor cavity 41 and the reactor vessel 42, or between the reactor and the spent fuel pool 43. A suitable grapple 50a, 50b, 50c is secured to the lower end of each of the lift cables 47a, 47b, 47c, respectively, for attaching the lift cables to the components to be lifted.

A typical sequence of moves involved in changing a control rod 20 using conventional tools will now be described with reference to FIGS. 4a–b and 5 of the drawings.

With the control rod 20 fully inserted in the control cell, two diagonally opposed fuel assemblies 26 are removed one at a time from the control cell using a main grapple 50a supported by the lift cable 47a of the main hoist 46a and transported to storage in the spent fuel pool 43, to an in-vessel storage rack 48, or to another core location as part of a fuel shuffle. A blade guide 49 is transported on the main grapple 50a of the lift cable 47a from a storage location and inserted into the open holes of the control cell left by the removed fuel assemblies 26. The remaining two fuel assemblies 26 are then removed one at a time from the control cell using the main grapple 50a and hoist 46a and are stored in the fuel pool 43 or other suitable location.

The control rod 20 is then fully withdrawn from the cell using the control rod drive mechanism 30, and the drive is then valved out of operation. The blade guide 49 is then removed from the control cell using the main grapple 50a and hoist 46a and taken to a storage location or left hanging from the lift cable 47a. This is represented by step (a) in FIG. 5.

A fuel support grapple 50b and grid guide are then installed on the lift cable 47b extending from the second hoist 46b. The arms of the grapple 50b are closed to allow the grapple 50b to pass through the top grid 51. After the grapple 50b has cleared the top grid 51, the grapple arms are released and the grapple 50b is lowered onto the fuel support piece 25. When the grapple 50b is correctly seated on the fuel support piece 25, the grapple 50b closes on the fuel support piece 25 and is then lifted free of the control rod guide tube 24 with the second hoist 46b. The fuel support piece 25 is then raised up through the top grid 51 and left suspended from the lift cable 47b of the second hoist 46b. This is represented by step (b) in FIG. 5.

The control rod 20 is then unlatched from the control rod drive 30 and removed using a control rod latch tool (not shown) supported by the third hoist 46c. A grid guide may be used with the latch tool. The control rod latch tool is lowered onto the top handle 52 of the control rod 20 with its lower section resting in the angle between two of the wings of the control rod 20.

When the latch tool is fully seated on the control rod 20, actuation of the tool with the engage button on the hoist pendant causes the lifting hook to engage the top handle 52 of the control rod 20 and the actuator hook in the lower end of the tool to engage and lift the unlatching handle 53 of the control rod 20, thus releasing the control rod 20 from the control rod drive 30. The control rod 20 is then lifted out of the guide tube 24 with the latch tool. As the control rod 20 is lifted, the position of the control rod drive 30 is monitored to verify that the control rod 20 has been successfully unlatched from the drive. The control rod 20 is then transported to the fuel storage pool 43 and placed in a storage rack 54. This is represented by step (c) in FIG. 5.

A new control rod 20 is then transported from the pool 43 with the control rod grapple 50c suspended from the third hoist 46c. This is represented by step (d) in FIG. 5. The new control rod 20 is placed in the control rod guide tube 24 and lowered to rest on the bottom of the guide tube 24. Coupling of the control rod 20 to the drive 30 is usually deferred until after the fuel support piece 25 and blade guide 49 have been inserted into the cell.

The fuel support piece 25 is then lowered into the control cell and over the top of the control rod 20 until it is seated in the top of the guide tube 24. This is represented by step (e) in FIG. 5. When the fuel support piece 25 is installed in the proper orientation, the grapple arms are released and the grapple 50b is lifted off of the fuel support piece 25.

The blade guide 49 is then installed in the control cell from its hanging position or its storage position. This is represented by step (f) in FIG. 5.

The control rod 20 is then recoupled by moving the piston 32 of the control rod drive 30 to a partially inserted position. The control rod 20 is then raised to its fully inserted position, and two fuel assemblies 26 are installed in the positions not occupied by the blade guide 49. The blade guide 49 is then removed, and two more fuel assemblies 26 are installed in the positions from which the blade guide 49 was removed.

Control rod replacement and shuffling operations at BWRs using the conventional procedures and tools described above often require excessively long times to perform. A wide variation in the time required (e.g., from 2 to 10 hours per control rod) and frequent long delays for serious problems (e.g., jammed fuel supports or inoperable tools) are common. Thus, there is a need for improved procedures and equipment to replace and shuffle control rods to minimize delays, to reduce average operation times, and to ensure safe operating conditions.

SUMMARY OF THE INVENTION

It is an object of the present invention to provide a control rod exchange multi-lift tool apparatus and procedure that solves the problems associated with the conventional equipment and procedures for replacing and shuffling control rods in a BWR as described above.

More specifically, it is an object of the present invention to provide an improved apparatus and procedure for replacing and shuffling control rods in a BWR which minimizes delays, reduces average operation times, and ensures safe operating conditions.

It is a further object of the present invention to provide a tool apparatus that combines several operations into one and thereby reduces the number of steps required to shuffle or replace control rods in a BWR.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a multi-lift tool apparatus is provided for moving control rod assemblies in a nuclear reactor, the multi-lift tool apparatus comprising: a frame having an upper end and a lower end; a control rod grapple supported by the frame for engaging a lifting handle of a control rod; and a fuel support piece grapple secured to the lower end of the frame for engaging and lifting a fuel support piece together with the control rod. The control rod grapple is movable along a length of the frame for raising and lowering the control rod relative to the frame. A blade guide grapple is secured to the upper end of the frame for engaging and lifting a blade guide together with the fuel support piece and the control rod.

An unlatching grapple is supported by the frame for engaging and lifting an unlatching handle of the control rod. The unlatching grapple is movable along a length of a lower portion of the frame for raising the unlatching handle of the control rod relative to the frame of the tool. The fuel support piece grapple comprises first and second tapered members for inserting into respective first and second holes of the fuel support piece.

A lift cable is connected to the control rod grapple and extends upwardly from the frame of the tool to a hoist. The lift cable is movable relative to the frame to move the control rod grapple along a length of the frame. A pair of sheaves are mounted near the upper end of the frame for guiding the lift cable to extend upwardly from the tool frame along a central longitudinal axis of the frame.

A first actuator is provided for selectively moving the control rod grapple into engagement with the lifting handle of the control rod. A plurality of second actuators are provided for selectively moving at least one latch of the fuel support piece grapple into engagement with the fuel support piece. A third actuator is provided for selectively moving the unlatching grapple into engagement with the unlatching handle, and a fourth actuator is provided for moving the unlatching grapple along a length of a lower portion of the frame for raising the unlatching handle of the control rod relative to the tool frame. A fifth actuator is provided for selectively moving the blade guide grapple into engagement with a handle of the blade guide.

According to a second aspect of the present invention, a method of moving a control rod assembly in a nuclear reactor is provided, comprising the steps of: lowering a lift tool into a control cell until a lower end of the lift tool is engaged with a fuel support piece; moving a control rod grapple supported by the lift tool into engagement with a lifting handle of a control rod; moving a fuel support piece grapple supported at a lower end of the lift tool into engagement with the fuel support piece; and raising the lift tool out of the control cell along with the control rod and the fuel support piece engaged with the lift tool, whereby the control rod and the fuel support piece are lifted out of the control cell together.

Before lowering the lift tool into the control cell, two diagonally opposed fuel assemblies are removed from the control cell, a blade guide is inserted into the two open spaces left by the two removed fuel assemblies, and the two remaining diagonally opposed fuel assemblies are removed from the control cell. A blade guide grapple supported by the tool is then moved into engagement with the blade guide. The blade guide is then raised out of the control cell along with the lift tool, control rod, and fuel support piece.

The method further comprises the steps of moving an unlatching grapple supported on a lower end of the lift tool into engagement with an unlatching handle of the control rod, and raising the unlatching grapple along with the unlatching handle relative to the frame of the lift tool to unlatch the control rod from the control rod drive. The control rod grapple is movable along a length of the frame of the lift tool to selectively raise and lower the control rod within the control cell relative to the fuel support piece.

BRIEF DESCRIPTION OF THE DRAWINGS

The present invention will become more clearly appreciated as the disclosure of the invention is made with reference to the accompanying drawings. In the drawings:

FIGS. 2b and 2c are detail views of portions of the control cell structure shown in FIG. 2a.

DETAILED DESCRIPTION OF THE INVENTION

Figure 1:
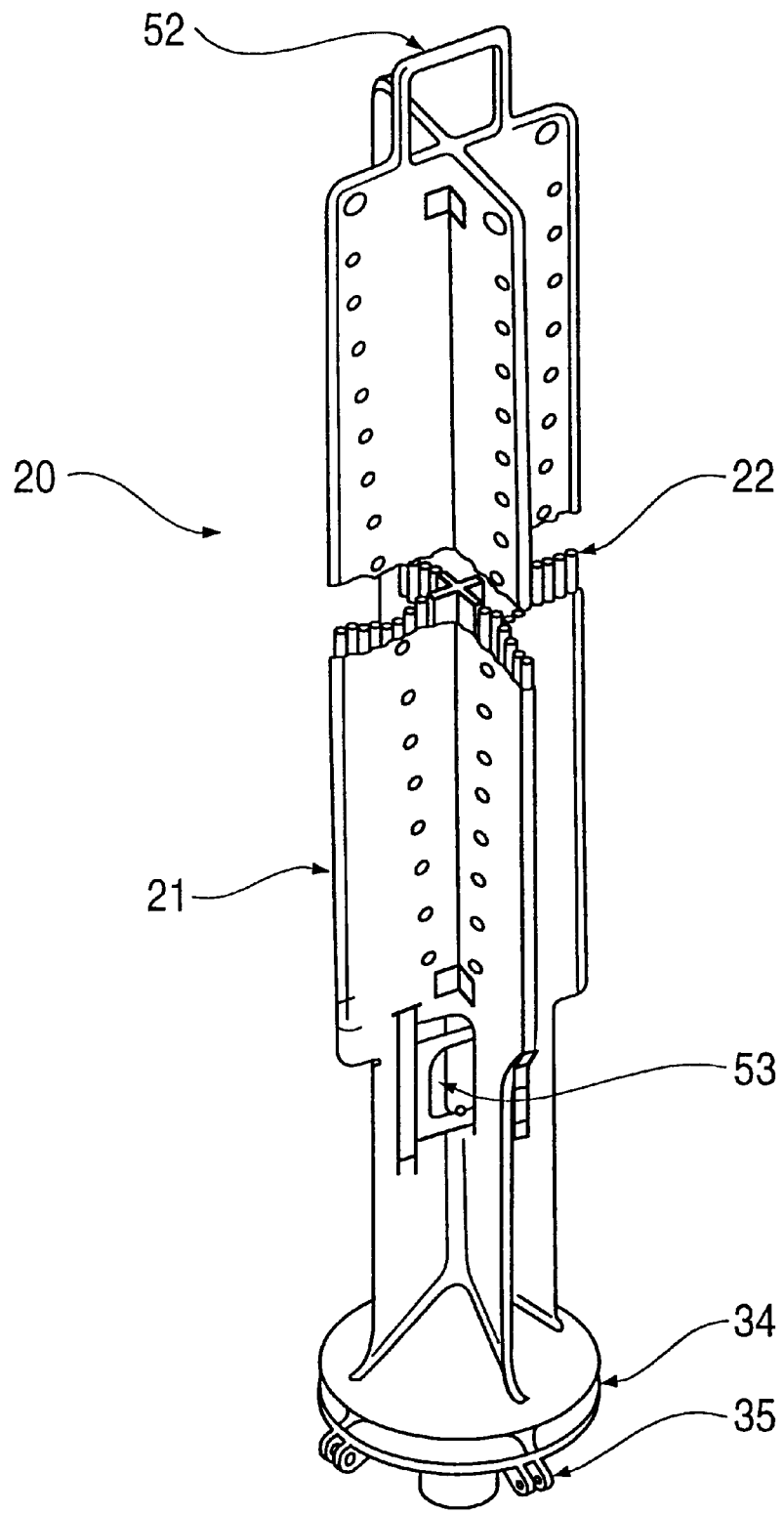
FIG. 1 is a perspective view of a conventional control rod for a boiling water nuclear reactor (BWR).
Figure 2A:
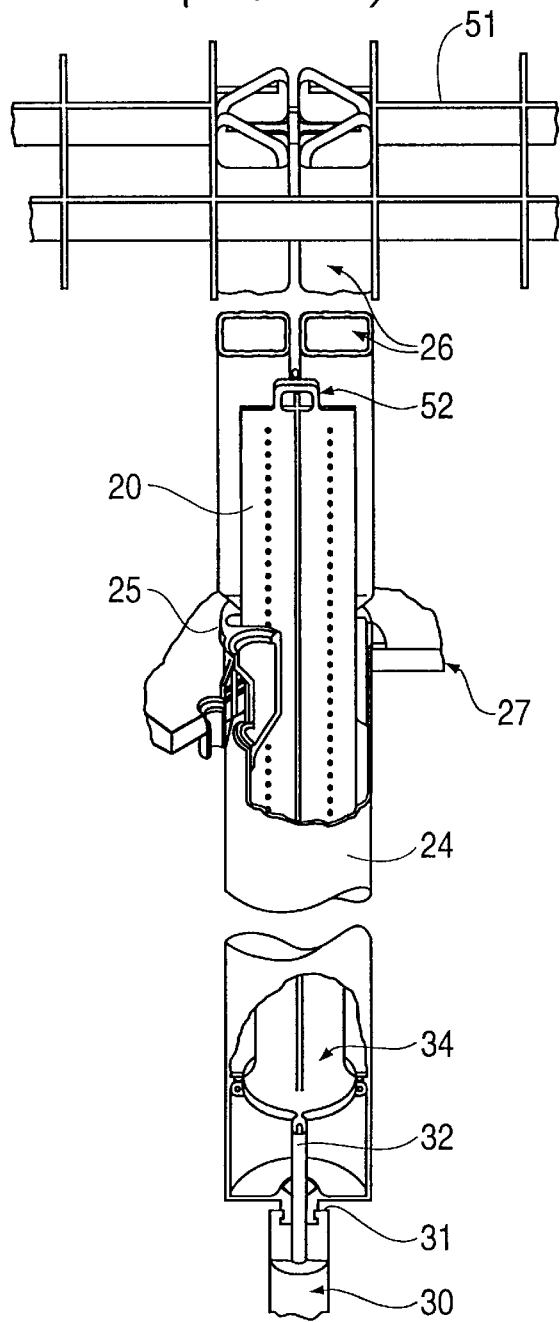
FIG. 2a is a perspective view of a conventional control cell structure.
Figure 2B:
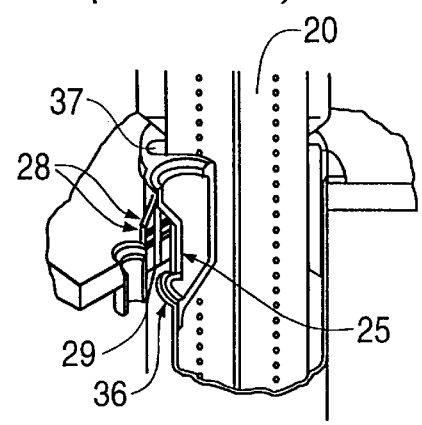
Figure 2C:
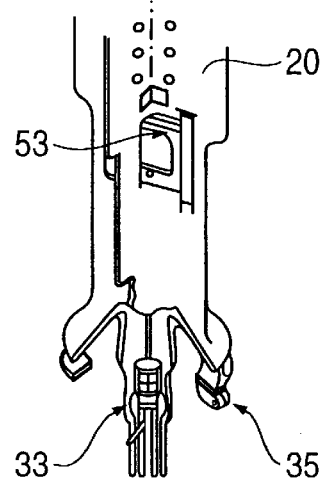
Figure 3:
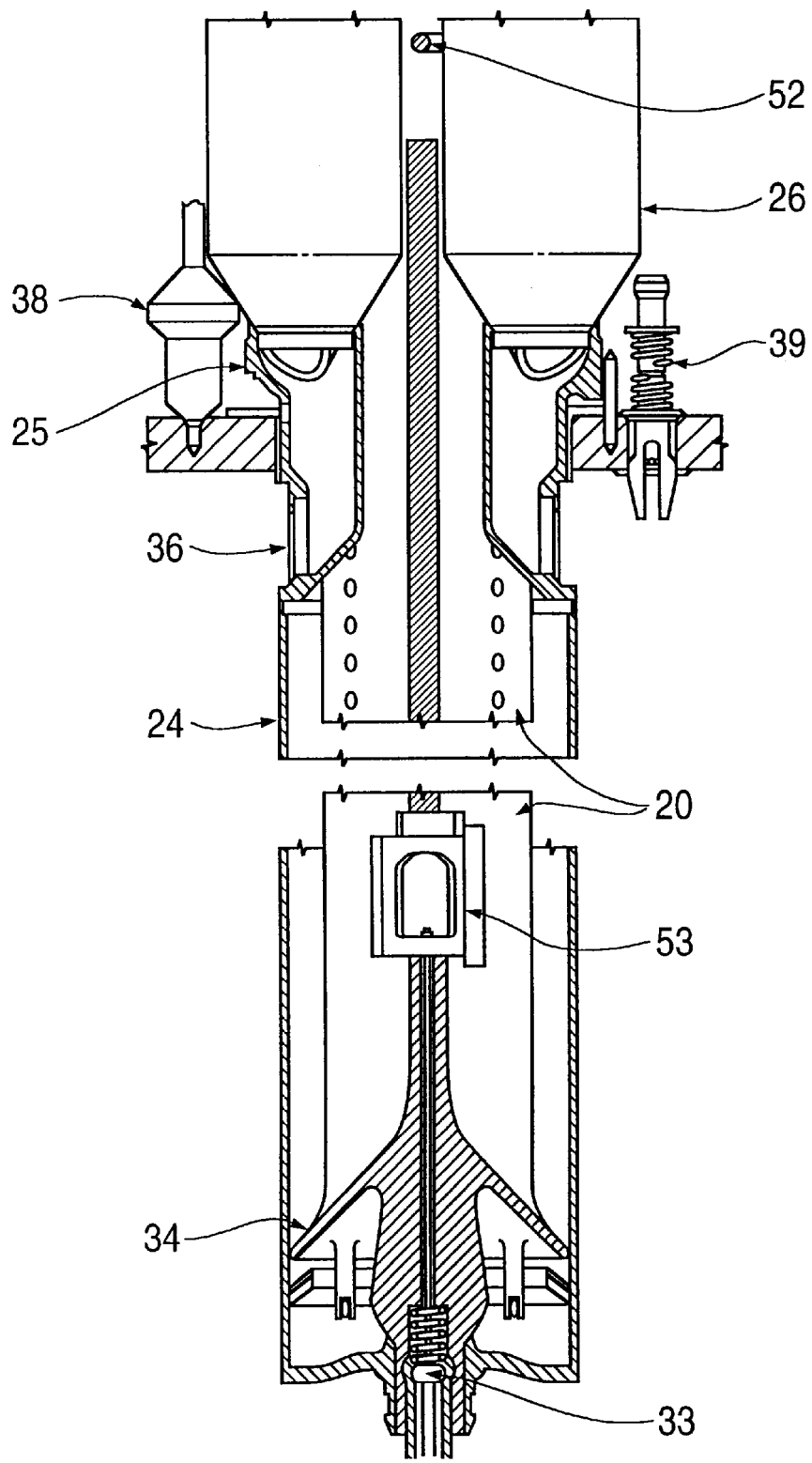
FIG. 3 is a cross-sectional view of a lower portion of a conventional control cell structure.
Figure 4A:
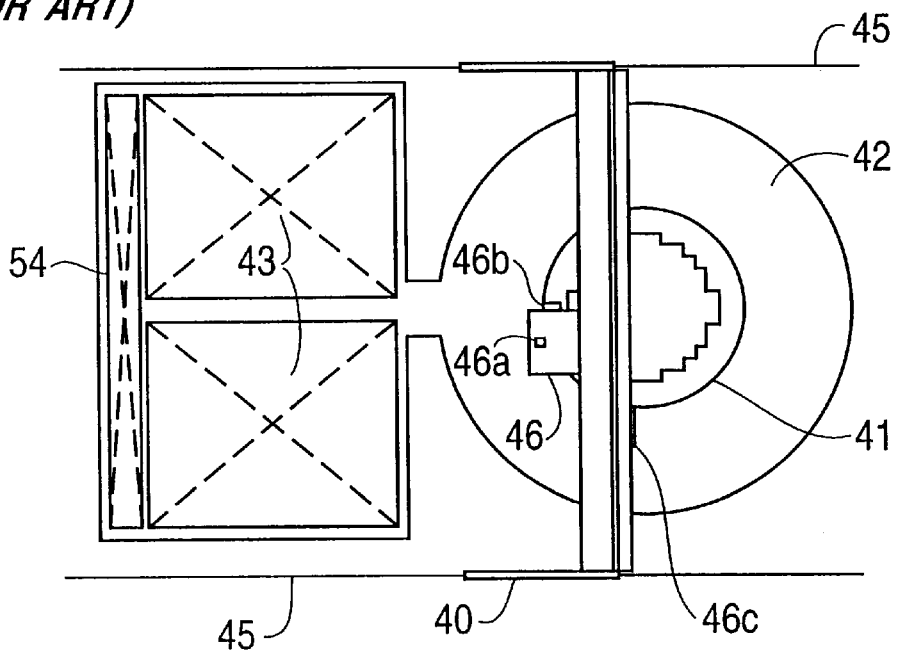
FIGS. 4a and 4b are plan and elevation views, respectively, of conventional lifting equipment for replacing and shuffling control rods in a BWR.
Figure 4B:
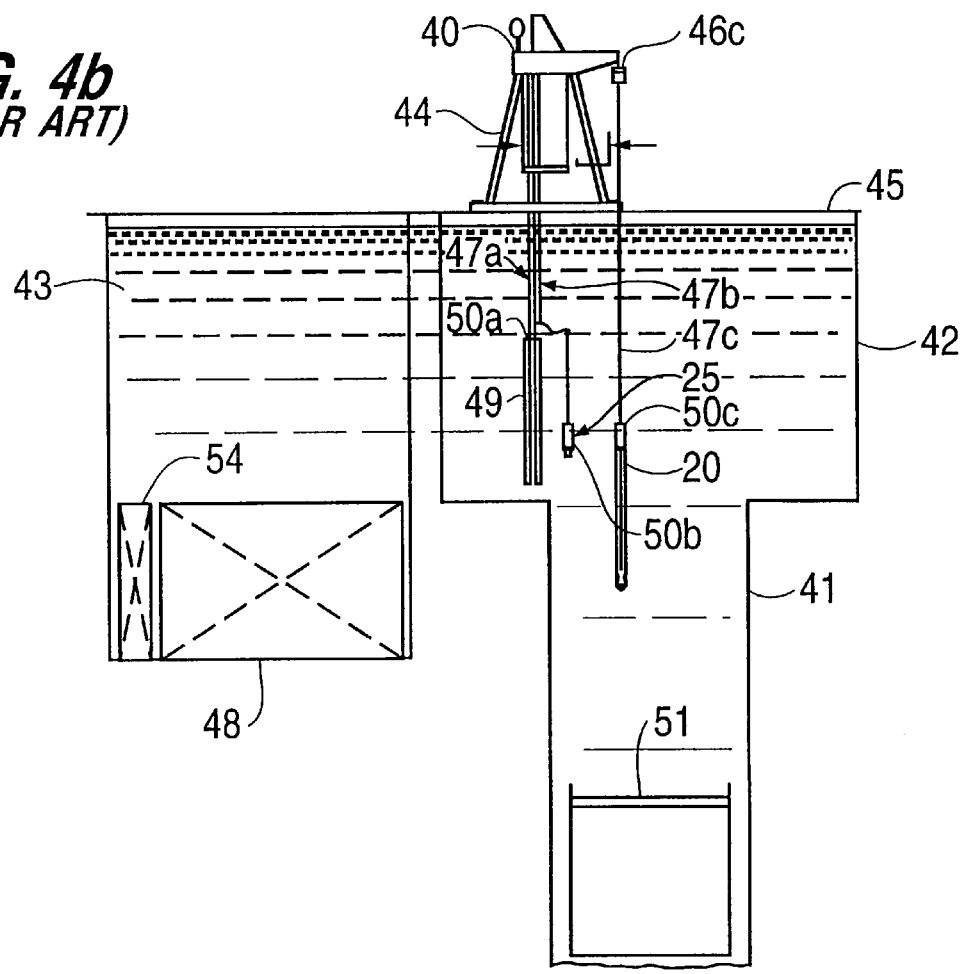
Figure 5:
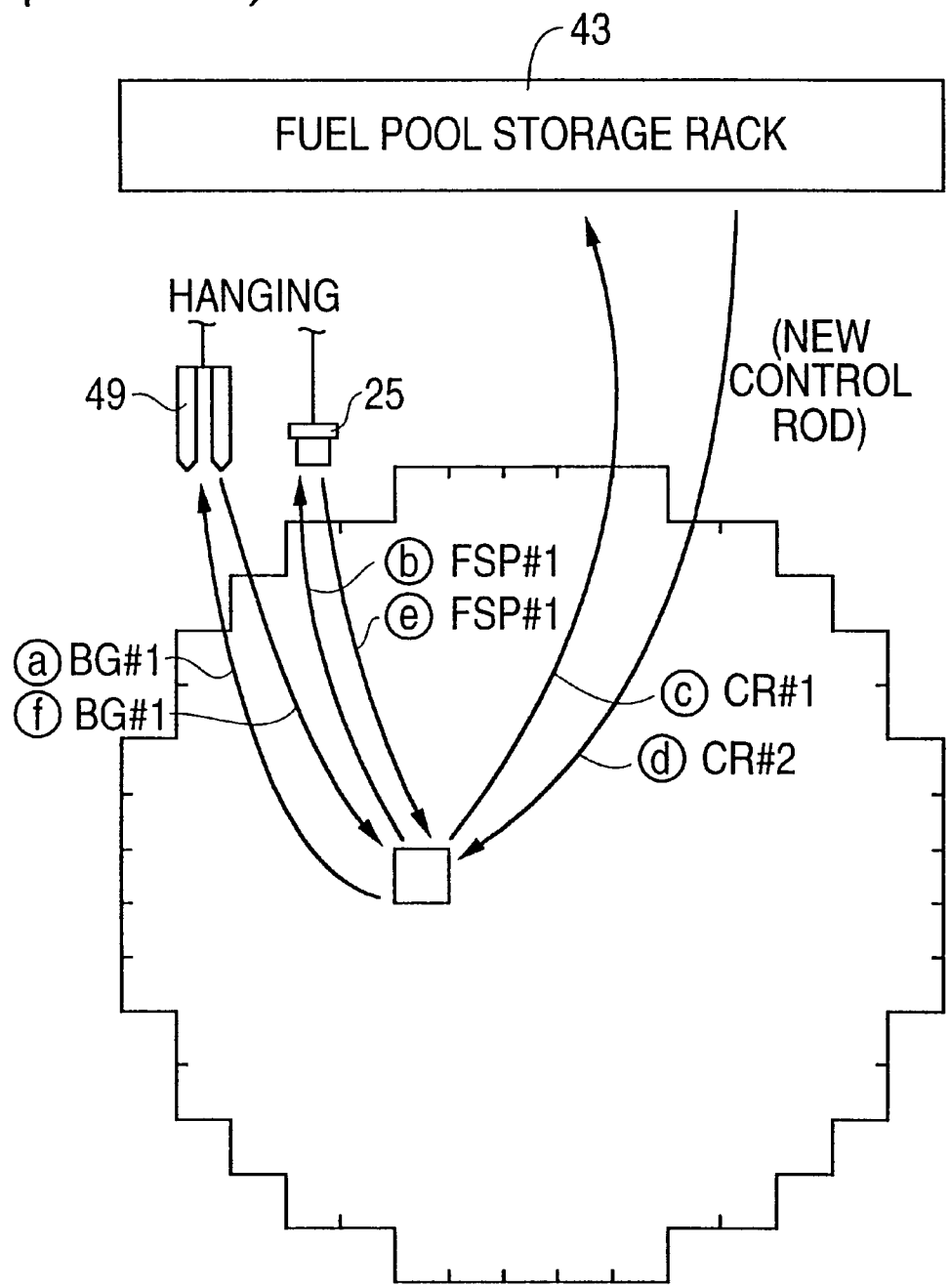
FIG. 5 is a schematic view of some of the moves required to replace control rods in a BWR using conventional tools.
Figure 6:
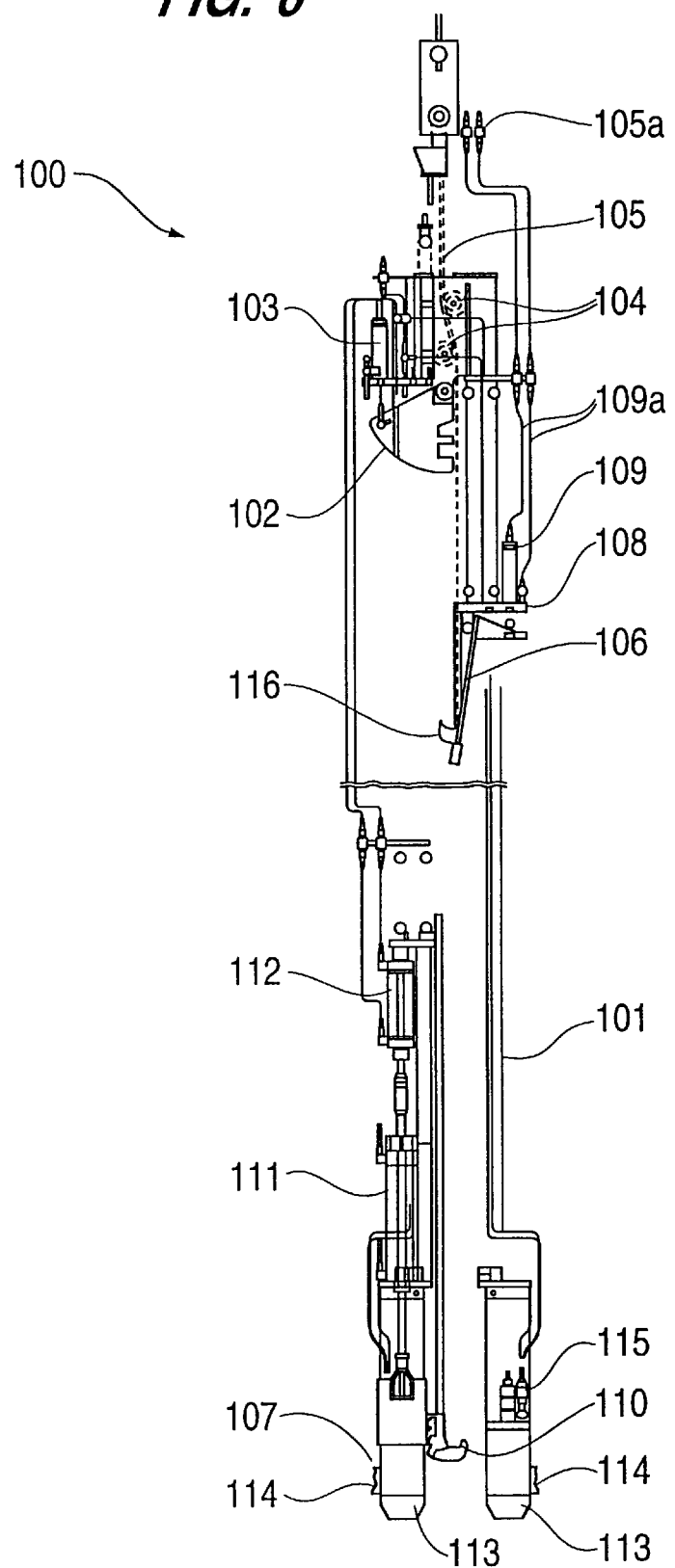
FIG. 6 is an elevation view of a multi-lift tool for shuffling and replacing control rods according to the present invention.
Figure 7:
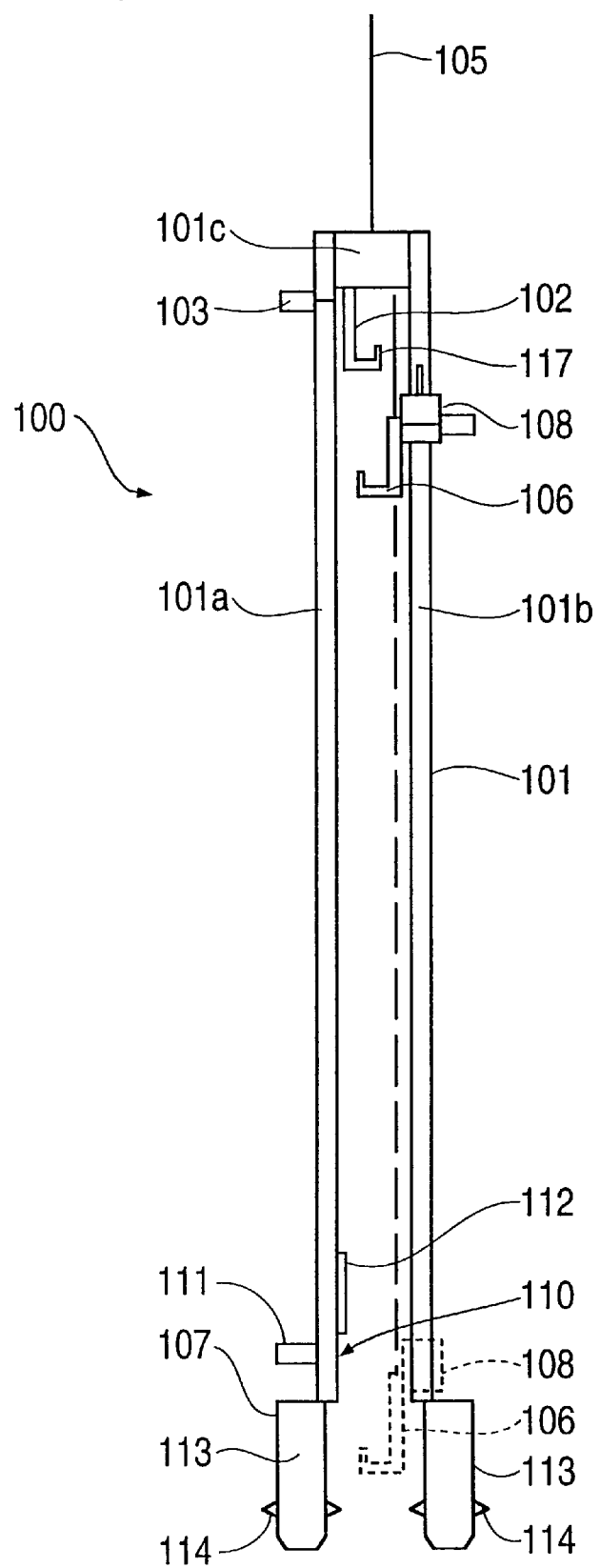
FIG. 7 is a schematic elevation view of the multi-lift tool according to the present invention.
Figure 8:
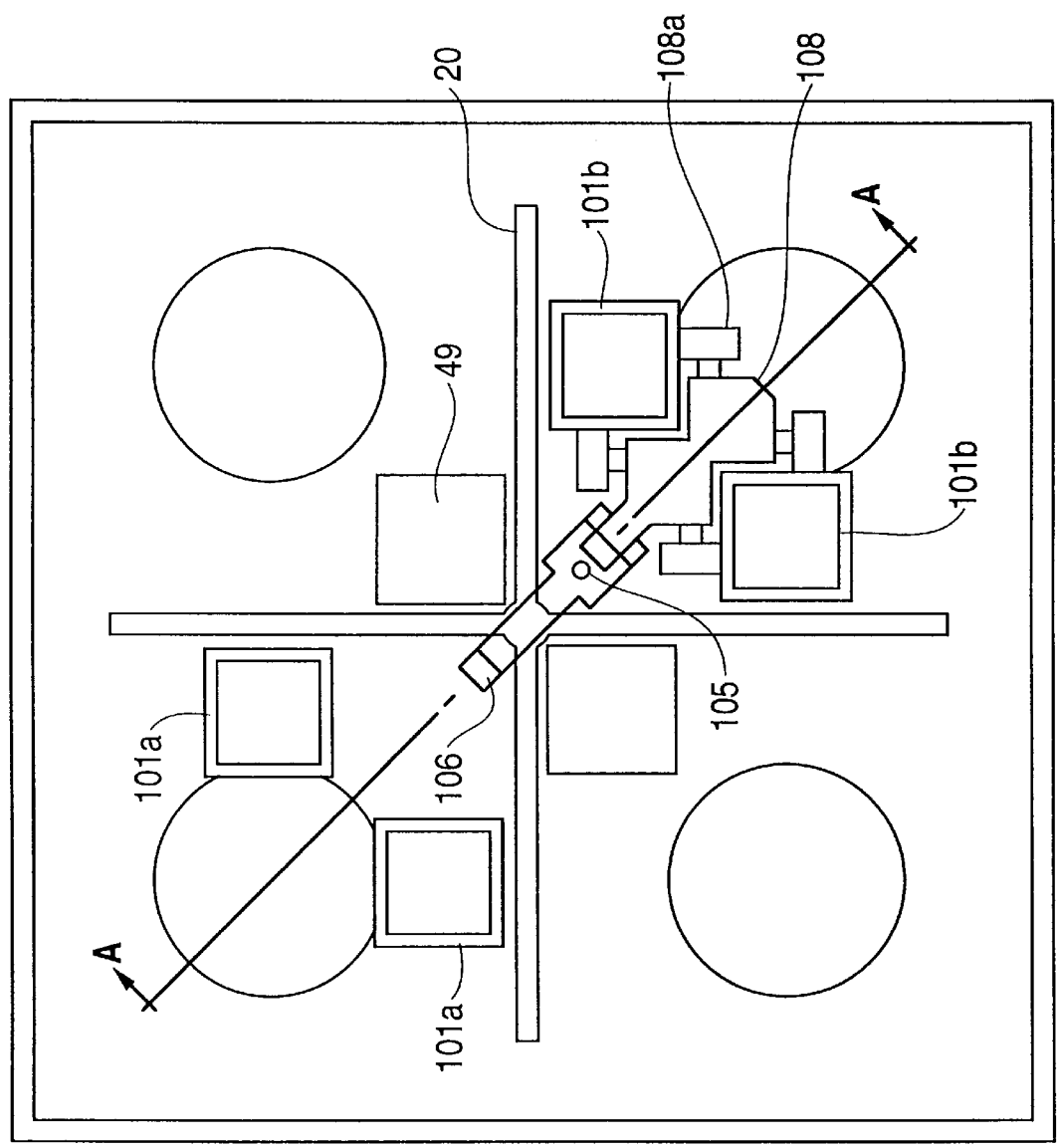
FIG. 8 is a cross-sectional plan view taken near the top of the multi-lift tool of the present invention.
Figure 9:
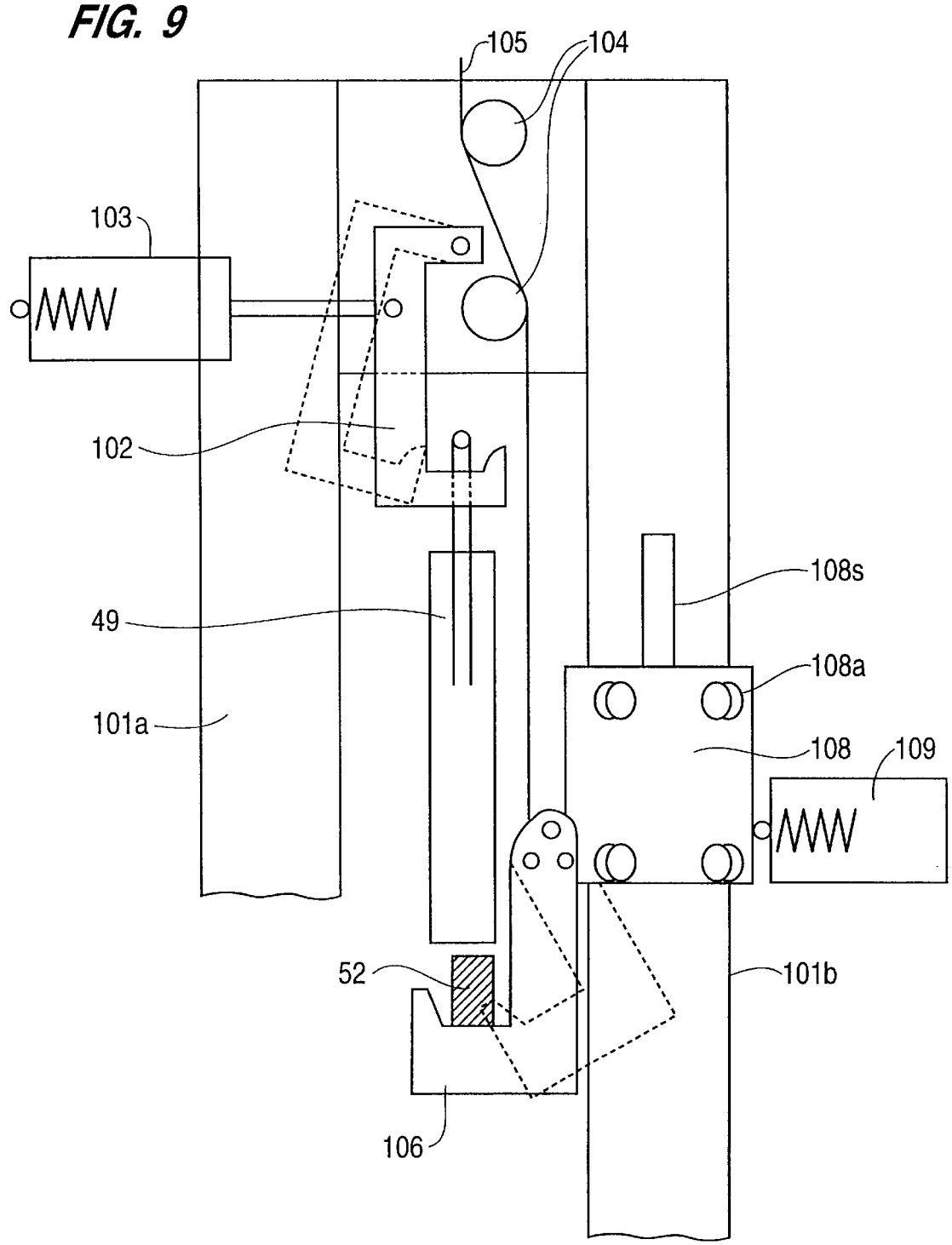
FIG. 9 is a detail side view of a top portion of the multi-lift tool as viewed generally along line A—A in FIG. 8.
Figure 10:
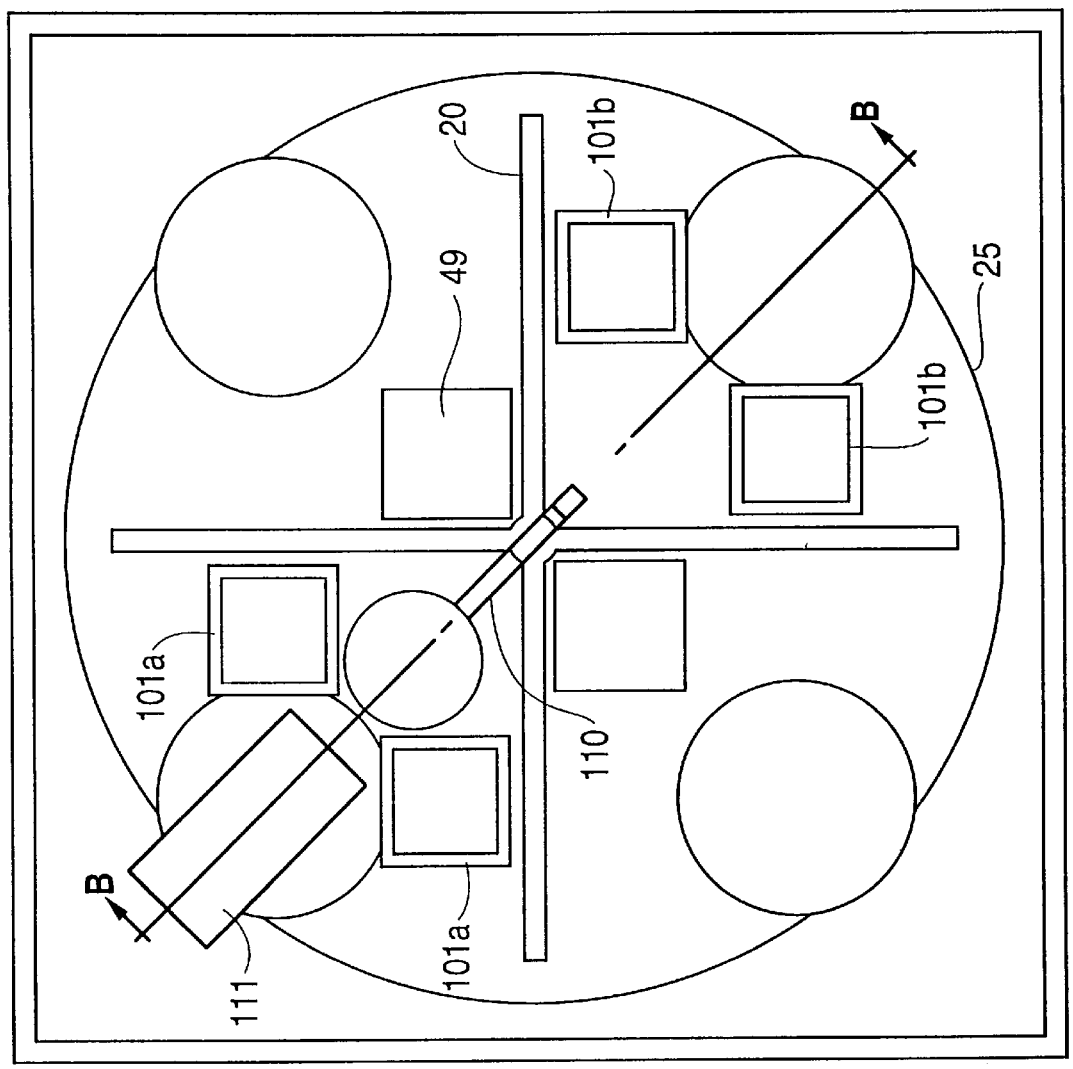
FIG. 10 is a cross-sectional plan view taken near the bottom of the multi-lift tool of the present invention.
Figure 11:
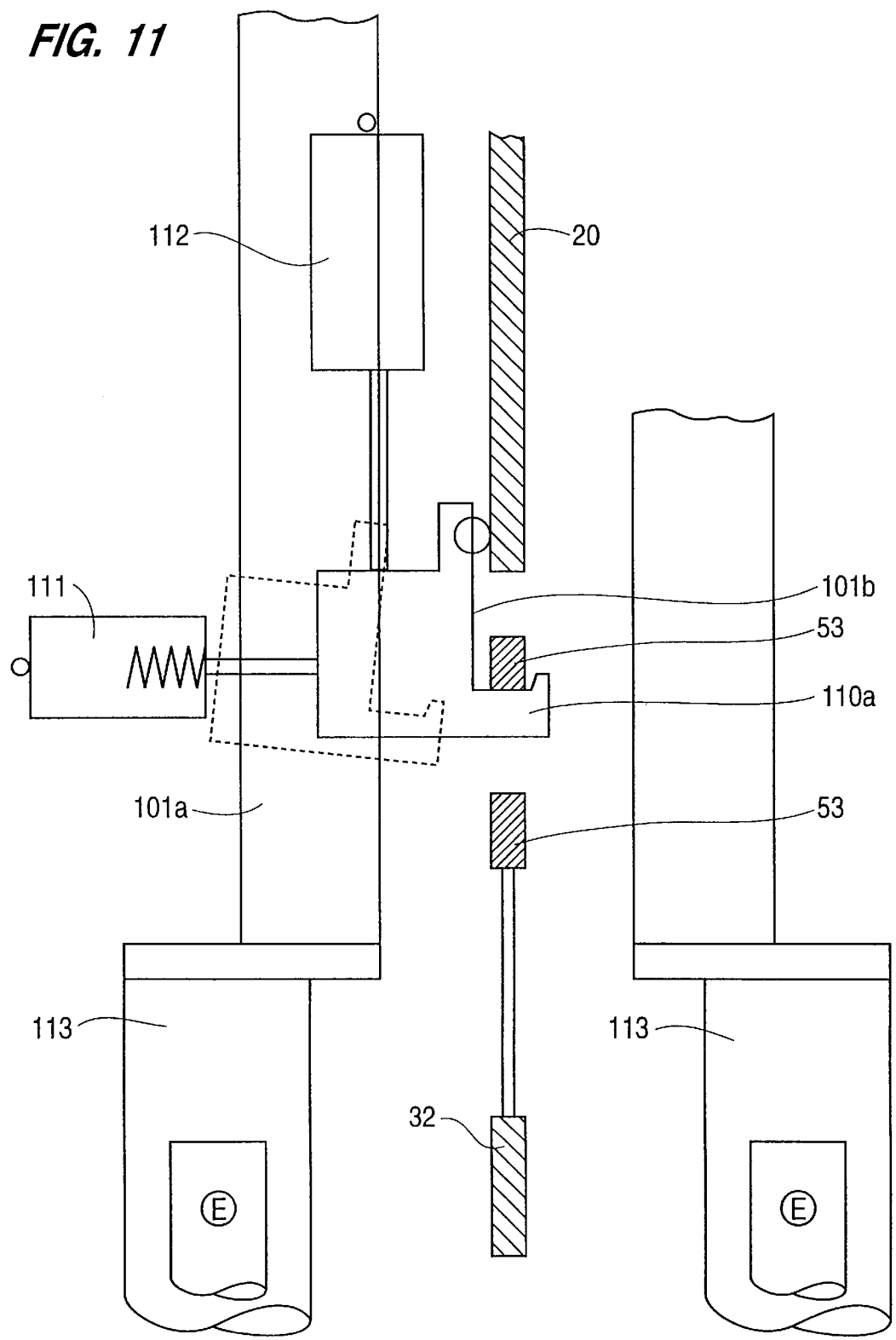
FIG. 11 is a detail side view of a bottom portion of the multi-lift tool as viewed generally along line B—B in FIG. 10.

Referring to FIGS. 6 to 13, a control rod exchange multi-lift tool 100 according to a preferred embodiment of the present invention will be described.

The multi-lift tool 100 according to the present invention is designed to save valuable outage time in a BWR by combining several lifts into one during control rod exchange or shuffle operations. This is accomplished with a single tool which combines existing technologies to lift the fuel support piece 25, the blade guide 49, and the control rod 20 all at once. When the multi-lift tool 100 of the present invention is used to exchange a control rod 20, the fuel support piece 25 and the blade guide 49 remain on the tool 100. The fuel support piece 25 forms the lower member of the tool frame as the control rod 20 is lifted from the guide tube 24. The blade guide 49 centers the whole lift and prevents hang-ups. With the multi-lift tool 100, reinsertion of the fuel support piece 25, the blade guide 49, and the control rod 20 is accomplished with a single operation. The multi-lift tool 100 also functions to unlatch the control rod 20 from the control rod drive 30 before lifting the control rod 20 from the guide tube 24.

The multi-lift tool 100 comprises a frame 101 made of square electropolished stainless steel tubes 101a, 101b. The tubes 101a, 101b are connected at the top by a bolted structure 101c which houses a blade guide grapple hook 102 with its operating cylinder 103. The tool 100 also includes sheaves or rollers 104 which transfer the lift cable 105 from an off-center control rod grapple 106 through the top of the tool 100 at a point generally along the central longitudinal axis of the tool 100. The bottom of the tubes 101a, 101b of the frame 101 connect to a fuel support piece grapple 107.

A control rod lifter 108 in the form of a small trolley is provided which travels the length of the tubes 101a, 101b of the frame 101 on one side of the tool 100. The control rod lifter 108 supports the control rod grapple 106 and is operable to lower the control rod 20 into its cell for latching the control rod 20 to the control rod drive 30 at the bottom of the cell. The control rod lifter 108 can also lower the control rod 20 into a storage or transfer container.

The control rod lifter 108 is connected directly to the lift cable 105 and is movable on cam rollers 108a along the length of the frame 101 by raising and lowering the lift cable 105. A lowered position of the control rod lifter 108 is shown in dashed lines in FIG. 7. When the control rod lifter 108 reaches its upper limit on the frame 101, the lifter 108 abuts a stop 108s and the whole assembly of the multi-lift tool 100, along with the blade guide 49 and the fuel support piece 25, can then be raised by the lift cable 105. The control rod grapple 106 is operated by a cylinder 109 to selectively engage and disengage with the control rod lifting handle 52. A bypass arrangement 105a is connected to the lift cable 105 above the tool 100 for guiding pressure lines 109a leading to the cylinder 109 around the sheaves 104.

An unlatching handle grapple 110 is provided at the lower end of the multi-lift tool 100 just above the fuel support piece grapple 107. The unlatching handle grapple 110 is operated by two cylinders 111 and 112. The first cylinder 111 positions a D-ring finger 110a into selective engagement with the unlatching handle 53 on the control rod 20. The second cylinder 112 provides a lifting force for disengaging the unlatching handle 53.

The fuel support piece 25 is grappled at the lower end of the tool 100 by the fuel support piece grapple 107. The grapple 107 comprises two cylindrical members 113 having tapered lower ends. Each cylindrical member 113 has three latches 114 which are operated by a respective cylinder 115 to move into locking engagement with the fuel support piece 25. The cylinders 115, like the other cylinders 103, 109, 111, 112 of the tool 100, cannot be activated while there is a load on the support device.

The weight of the total lift according to the present invention is preferably under 1,000 pounds, which is within the lift capacity of the conventional hoists 46a, 46b, 46c provided for exchanging and shuffling the control rods 20 in a BWR. Only the weight of the control rod 20 is on the hoist during unlatching (i.e., when lifting the unlatching handle 53). The multi-lift tool 100 itself weighs approximately 400 pounds.

Figure 12A:
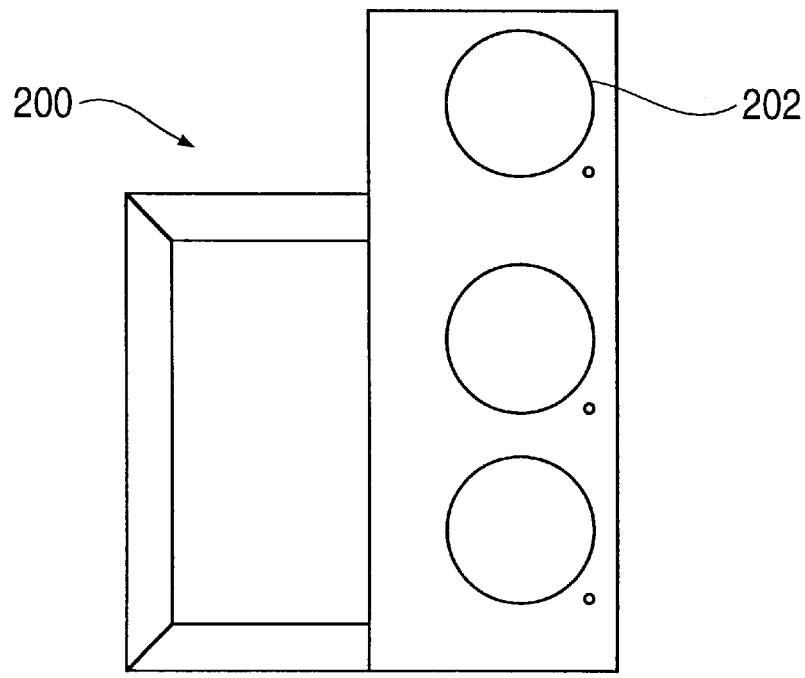
FIGS. 12a and 12b are a plan view and side view, respectively, of an in-vessel storage station according to the present invention for storing two control rod blades and one fuel support piece.
Figure 12B:
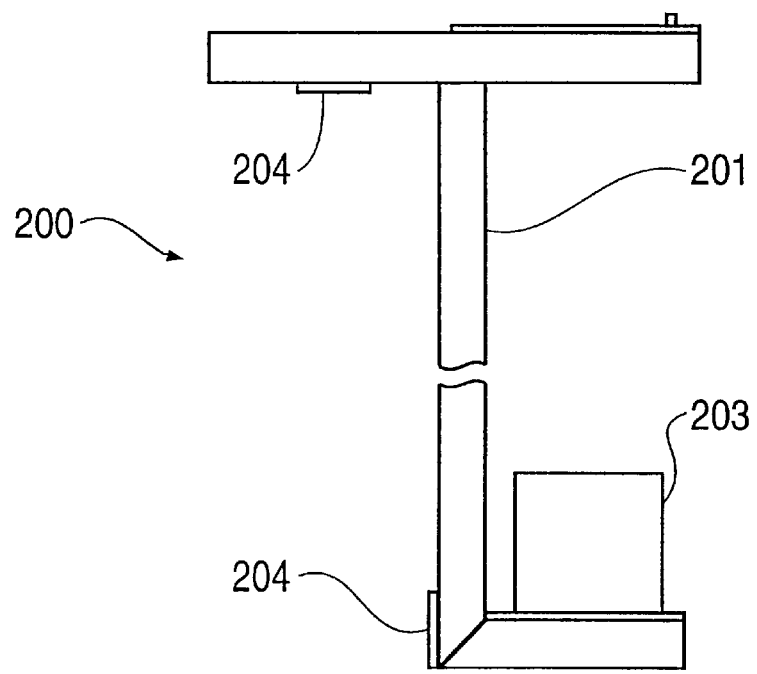

An in-vessel storage station 200 according to the present invention is shown in FIGS. 12a and 12b for storing two control rods 20 and one fuel support piece 25. The storage station 200 comprises a frame 201 which hangs from the reactor flange and is retained by hooks which go around the studs on the reactor vessel. The storage station 200 is easily lowered into position with a cable which can be attached to the handrail for easy retrieval during removal. Alternate locations outside the reactor can be arranged according to individual plant preferences.

The top of the storage station 200 has three openings 202 which simulate the core support plate openings. The lower end has two cups 203 which can receive the lower end of the control rods 20. The storage station 200 is constructed of electropolished stainless steel which is welded or bolted together for ease of decontamination and movement. A plurality of pads 204 made of delrin or other suitable material interface with the reactor.

Figure 13:
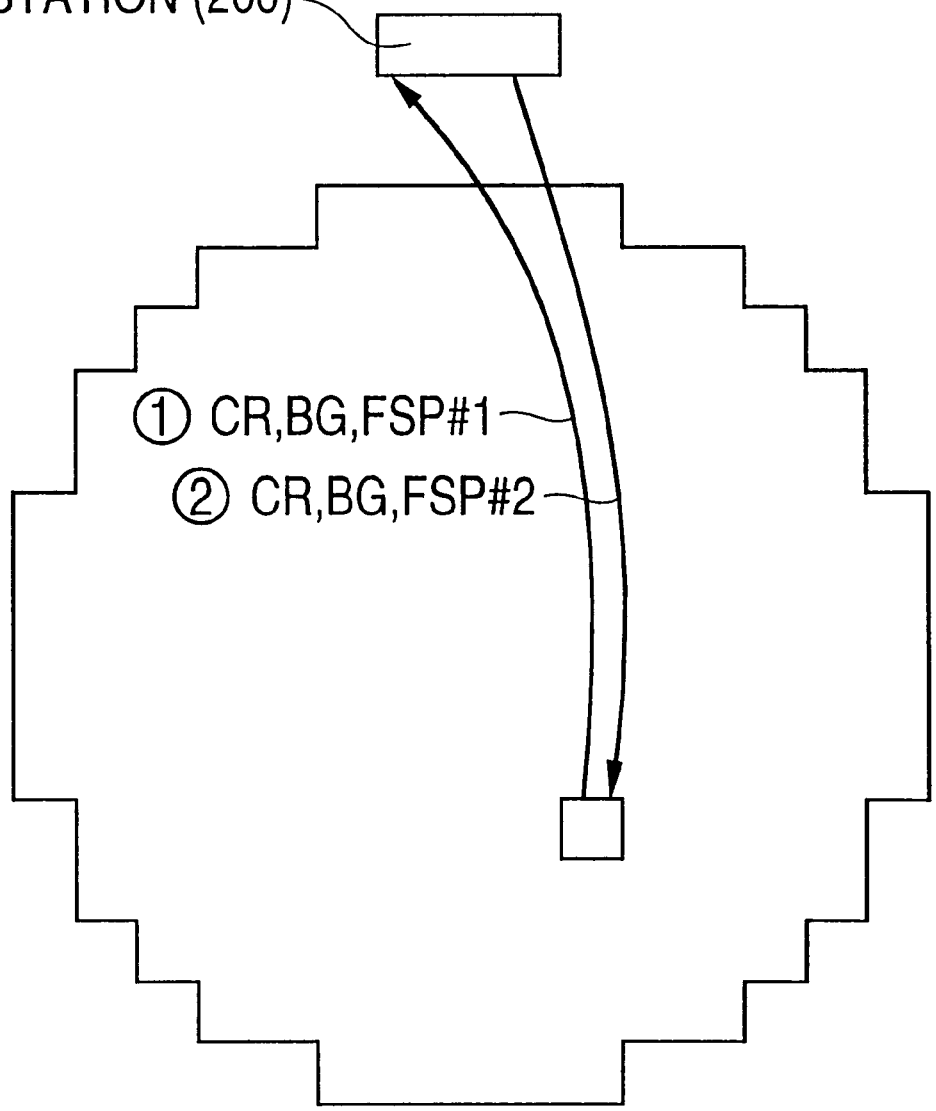
FIG. 13 is a schematic view of the moves required to replace control rods in a BWR using the multi-lift tool according to the present invention.

A sequence of moves involved in changing or shuffling a control rod using the multi-lift tool 100 according to the present invention will now be described with reference to FIG. 13 of the drawings.

With the control rod fully inserted in the control cell, two diagonally opposed fuel assemblies 26 are removed one at a time from the control cell with the main grapple and transported to storage in the spent fuel pool, to an in-vessel storage rack, or to another core location as part of a fuel shuffle. A blade guide 49 is transported on the main grapple from a storage location and inserted into the open holes of the control cell. The remaining two fuel assemblies 26 are then removed one at a time from the cell with the main grapple and are stored in the pool or another location. The operation up to this point is the same as in the conventional procedures.

The multi-lift tool 100 is then placed into the cell with the control rod 20 fully inserted. The cylinders on the multi-lift tool 100 are actuated to grapple the fuel support piece 25, the blade guide 49, and the control rod 20. Video cameras are inserted into the open holes of the control cell (i.e., the holes without the blade guide 49 positioned therein) to verify the latching operations.

The multi-lift tool 100 is then actuated to grapple the unlatching handle and unlatch the control rod 20 from the control rod drive 30 with the control room giving a continuous withdraw signal. The control rod drive 30 is then withdrawn to the overtravel position.

The whole assembly is then lifted from the control cell and moved to a new control rod storage position. This is represented by step (1) in FIG. 13. This storage position can include, for example, the in-vessel storage station 200 or a suitable rack in the spent fuel pool.

The old control rod 20 and fuel support piece 25 are then discharged, and the multi-lift tool 100 is moved to another part of the storage station and attached to a replacement control rod 20 and fuel support piece 25 for the cell.

The multi-lift tool 100 then carries the assembly comprising the new control rod, the original blade guide 49, and the new fuel support piece 25 to a position above the control cell. This is represented by step (2) in FIG. 13. The multi-lift tool 100 then places the new assembly into the control cell and lowers the control rod 20, thereby seating the fuel support piece 25, the blade guide 49, and the control rod 20 in the control cell. The placement and alignment of the fuel support piece 25 onto the anti-rotation pin is verified with a camera in one of the two open holes of the control cell. The multi-lift tool 100 is then withdrawn.

With the control rod 20 raised to its fully inserted position, two fuel assemblies 26 are installed in the positions not occupied by the blade guide 49. The blade guide 49 is then removed, and two more fuel assemblies 26 are installed in the positions from which the blade guide 49 was removed.

A number of interlocks and safety features are built into the multi-lift tool 100 according to the present invention. For example, the control rod grapple 106 has a retaining barb 116. The operating cylinder 109 does not have the power to overcome the weight of the control rod 20 against the control rod grapple 106 with the retaining barb 116 at its outer edge. The lift cable 105 is attached directly to the control rod grapple 106 so that its function cannot be bypassed when the tool 100 is moved under load. Due to the sliding trolley arrangement, the control rod 20 cannot be lowered out of the lift assembly without the bottom end of the assembly being supported.

The blade guide grapple 102 also has a barb 117 to retain the handle of the blade guide 49. While the fuel support piece 25 is attached, the blade guide grapple 102 is redundant since the fuel support piece 25 prevents the blade guide 49 from being lowered. The blade guide grapple 102 is barbed to prevent the blade guide 49 from moving and is hinged in a way which would support the blade guide 49 if the power is shut off.

The multi-lift tool 100 lifts the blade guide 49 with the control rod 20. Since this assembly is never completely below the grid 51, there is a greatly reduced chance of any type of hang-up either going down through the grid 51 or in the removal process. No hoist overloads are necessary for this reason. When the tool 100 is empty, the tubes 101a, 101b of the frame 101 function as a guide to locate the tool 100 centrally in the grid opening.

The unlatching handle grapple 110 can be left in its unlatched position for added lifting safety during transport if desired.

The fuel support piece 25 is grappled by the two bullet nosed grapples 107. Each bullet nose 113 has three latches 114 which cannot be actuated when the weight of the fuel support piece 25 is on them. This is a double redundant system since the latches 114 must move up in order to unlatch and there are two direct support paths (i.e., two bullet noses 113), each with three latches 114.

During raising and lowering of the control rod 20, the blades of the control rod 20 are guided by the blade guide 49 which is, at that time, integral with and supported by the tool 100. Thus, all surfaces of the blades of the control rod 20 are protected during movement with the tool 100 in the same manner as during operation of the BWR.

Safety interlocks with the hoist are maintained for the control rod 20 withdrawal because the lift cable 105 only lifts the control rod 20 during the unlatching operation. After the control rod 20 is unlatched and the control rod drive 30 is withdrawn, the trolley 108 is raised to the hardstop 108s on the frame 101 and only then does the weight of the other members rest on the lift cable 105 of the hoist.

Corrosion resistance is enhanced by the use of stainless steel parts. Where possible these parts are electropolished for ease of decontamination. Aluminum parts can be used for certain components, but must receive a hard anodized coating to resist corrosion.

Loose parts are controlled predominantly by lock wiring since most of the construction of the tool 100 embodies bolting methods. In some isolated instances, a locking agent can be used to prevent loosening of parts, particularly if the part is not subjected to significant torque. Bent tab keepers can also be used to prevent loosening of parts on the tool 100.

The reactor water will provide sufficient lubrication to permit smooth operation of the moving parts of the tool 100. The cylinders 103, 109, 111, 112, and 115 of the tool 100 are preferably air cylinders which will perform optimally using 90–120 psig air supplies. The end of the lift cable 105 is adaptable for use with any desired hoisting device positioned over the BWR.

The core configuration for support of the tool 100 does not need to be changed after initial removal of fuel and installation of the blade guide 49. The tool 100 removes the control rod 20, the blade guide 49, and the fuel support piece 25 together. The control rod drive 30 is retracted during the unlatching of the control rod 20 within the tool 100. The installation of the control rod 20 using the tool 100 takes place in the same manner, except the control rod 20 is lowered to the control rod drive 30.

The whole tool 100 is inserted into the control cell guided by the existing blade guide 49 and the control rod 20. Once installed, the top of the tool 100 is still above the grid 51 allowing ease of removal guided by the blade guide 49. The bottom of the assembly of the tool 100, the blade guide 49, and the control rod 20 is stiffened by the fuel support piece 25.

Each of the operation cylinders 115 for the fuel support piece grapple 107 has a double ended shaft which can be used to visually determine the position of the latches 114. If the latches 114 are not extended, the cylinders 115 will not stroke. Visual verification is possible through the two fuel positions which are not occupied by the blade guide 49.

One cell is removed completely with the fuel support piece 25. The control rod 20 is then placed in an intermediate position such as a so-called gun barrel or in-vessel storage station 200 (FIGS. 12a, 12b). A new control rod 20 is retrieved from the same intermediate position, and the assembly is returned to the original cell as a whole for relatching. The fuel support piece 25 may be released onto the same intermediate position in unusual situations, such as during replacement of the fuel support piece 25.

The tool 100 is capable of placing the control rod 20 into the gun barrel, but not with the fuel support piece 25 on the tool. The fuel support piece 25 must be set down on the in-vessel storage station 200 or another gun barrel before the control rod 20 can be lowered fully. Modification of the gun barrel by cutting down the height by 20 inches or adding a spool support piece inside the barrel are alternate solutions.

The multi-lift tool 100 according to the present invention solves many of the problems with conventional tools for exchanging and shuffling control rods. For example, the multi-lift tool 100 is not subject to the problem of jamming under the grid 51 because part of the tool 100 always remains above the grid 51. In addition, the blade guide 49 becomes an integral part of the tool 100 during the lift operation providing guidance in the horizontal and rotational directions at all times after the assembly enters the grid 51. Access for video cameras is possible through the two fuel locations not taken up by the blade guide 49.

Slack cable is not an issue because the trolley 108 can be made to weigh the necessary amount to draw the lift cable 105 into the tool 100.

The multi-lift tool 100 is suited to either of the hoists 47a, 47c available on the refuel bridge. The total weight of the tool 100 with the attached blade guide 49, control rod 20, and fuel support piece 25 is less than 1000 pounds. Therefore, the hoist used can be the one with the most accessibility for the user, thereby improving safety. Moreover, the tool 100 can be designed to be used with any of the hoists 47a, 47b, 47c available on the refuel floor by making it usable with either a rigid pole system fitting or a threaded connection on the end of the lift cable.

No batteries or electrical connections are required for the verification processes associated with the multi-lift tool 100. All of the grapples 102, 106, 107 can be observed at the same time through the frame for positive verification of engagement. The position of the fuel support piece grapples 107 is observed by the position of the top of the double ended actuation cylinders 115. Therefore, it is not necessary to use sensors with the tool 100.

Rotational positioning of the fuel support piece 25 is controlled at the entrance to the grid 51. After this point, there is no possibility of the fuel support piece 25 rotating due to the presence of the blade guide 49 as part of the assembly. Engagement with the grid 51 is maintained throughout the lowering and raising of the assembly.

The unlatching handle 53 is grappled by the unlatching handle grapple 110 using the two cylinders 111, 112. The cylinders 111, 112 are directly connected to the frame 101 which, in turn, is stiffened by the presence of the fuel support piece 25. The two cylinders 111, 112 are operated to provide easy access and unlatching of the control rod 20.

Since the tool 100 does all the operations associated with the control rod 20 changeout, no time is wasted changing out between tools, as in the conventional changeout procedures.

Additional savings are realized in dose reduction. The unlatching operations are accomplished with an unlatching handle grapple 110 designed for maximum vertical flexibility. The vertical height depends on the vertical cylinder 112 operating the unlatching handle grapple 110.

The unlatching handle grapple 110 is designed to sustain the weight of the control rod 20, however this is not the primary method of supporting the control rod 20. The main control rod grapple 106 is at the top of the multi-lift tool 100. When both grapples 106 and 110 are latched there is redundancy in the lift. The unlatching handle grapple 110 can be eliminated from the lift sequence if desired due to the unique application of the trolley lift.

The blade guide 49 becomes an integral part of the positioning of the control rod 20 within the tool 100 and provides the necessary guidance. Two fuel positions are essentially open in the control cell to allow camera access to the entire length of the tool 100. This same access provides clearance to insert a conventional rigid pole system for remedial action should that ever be required.

The multi-lift tool 100 has no unguided air hoses below the grid 51 because a portion of the tool 100 is always above the grid 51. Only the air hose cluster, the lift cable 105, and a guide rope (not shown) extend to the surface. The guide rope is used to counter rotation of the tool 100 before it enters the grid 51. The rotation is usually caused by the lift cable 105 unwinding as it is played out from the hoist.

The multi-lift tool 100 according to the present invention has the potential of changing a two hour exchange of the control rod 20 into a half hour exercise without hangups. This adds a great deal of consistency to the operation. Since the unlatching of the control rod 20 takes place with the control rod 20 in the up position, some communication time can be saved with the control rod drive operation. Unlatching is allowed with the control rod 20 inserted because the blade guide 49 travels with and becomes part of the multi-lift tool 100.

The following Table 1 shows a comparison of the typical times required for the control rod replacement procedures using the conventional tools and using the improved multi-lift tool 100 of the present invention.

TABLE 1

Time Comparison for Blade Replacement Operations

| | Operation | Current Time (min) | Multi-Lift Time (min) |
|---|---|---|---|
| a. | BG cell to hanging | 5 | |
| b. | FSP cell to hanging | 13 | |
| c. | CR cell to pool rack | 36 | 15 |
| d. | CR pool rack to cell | 27 | 15 |
| e. | FSP hanging to cell | 20 | |
| f. | BG hanging to cell | 8 | — |
| | Total Time | 109 | 30 |

The savings noted in the above table results in 79 minutes per cell exchange, or approximately one hour. If this exchange is made while the BWR is on critical path at a rate of approximately $10,400 per hour, the savings is as follows:

| 10 Blades Replaced | $104,000 Savings |
|---|---|
| 20 Blades Replaced | $208,000 Savings |

Thus, the cost of the new multi-lift tool 100 can be easily justified in just one outage. Similarly, a control rod shuffle can be accomplished very quickly changing a cell operation from 4 hours to around 1 hour due to the elimination of steps. The use of two multi-lift tools according to the present invention could further enhance this operation or the exchange noted above.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A multi-lift tool apparatus for moving control rod assemblies in a nuclear reactor, comprising:
   a frame having an upper end and a lower end;
   a control rod grapple supported by said frame for engaging a lifting handle of a control rod;
   a fuel support piece grapple secured to the lower end of the frame for engaging and lifting a fuel support piece together with the control rod; and
   a blade guide grapple secured to the upper end of the frame for engaging and lifting a blade guide together with the fuel support piece and the control rod.

2. The multi-lift tool apparatus as set forth in claim 1, wherein said control rod grapple is movable along a length of said frame for raising and lowering the control rod relative to said frame.

3. The multi-lift tool apparatus as set forth in claim 1, further comprising an unlatching grapple supported by said frame for engaging and lifting an unlatching handle of the control rod.

4. The multi-lift tool apparatus as set forth in claim 3, wherein said unlatching grapple is movable along a length of a lower portion of said frame for raising the unlatching handle of the control rod relative to said frame.

5. The multi-lift tool apparatus as set forth in claim 1, wherein said fuel support piece grapple comprises first and second tapered members for inserting into respective first and second holes of said fuel support piece.

6. The multi-lift tool apparatus as set forth in claim 1, further comprising a lift cable connected to said control rod grapple and extending upwardly from said frame to a hoist, said lift cable being movable relative to said frame to move said control rod grapple relative to said frame.

7. The multi-lift tool apparatus as set forth in claim 6, further comprising a pair of sheaves mounted near the upper end of said frame, said lift cable being guided by said sheaves to extend upwardly from the upper end of said frame generally along a central longitudinal axis of said frame.

8. The multi-lift tool apparatus as set forth in claim 1, further comprising a first actuator for selectively moving said control rod grapple into engagement with the lifting handle of the control rod.

9. The multi-lift tool apparatus as set forth in claim 8, further comprising a pair of second actuators for selectively moving a plurality of latches of the fuel support piece grapple into engagement with the fuel support piece.

10. A multi-lift tool apparatus for moving control rod assemblies in a nuclear reactor, comprising:
    a frame having an upper end and a lower end;
    a control rod grapple supported by said frame for engaging a lifting handle of a control rod;
    a fuel support piece grapple secured to the lower end of the frame for engaging and lifting a fuel support piece together with the control rod;

a first actuator for selectively moving said control rod grapple into engagement with the lifting handle of the control rod;

a pair of second actuators for selectively moving a plurality of latches of the fuel support piece grapple into engagement with the fuel support piece; and an unlatching grapple supported by said frame for engaging and lifting an unlatching handle of the control rod;

a third actuator for selectively moving the unlatching grapple into engagement with the unlatching handle; and a fourth actuator for moving the unlatching grapple along a length of a lower portion of the frame for raising the unlatching handle of the control rod relative to said frame.

11. The multi-lift tool apparatus as set forth in claim 10, further comprising a blade guide grapple secured to the upper end of the frame for engaging and lifting a blade guide together with the fuel support piece and the control rod, and a fifth actuator for selectively moving the blade guide grapple into engagement with a handle of the blade guide.

12. A method of moving a control rod assembly in a nuclear reactor, comprising the steps of:

removing two diagonally opposed fuel assemblies from a control cell;

inserting a blade guide into two open spaces left by the two removing fuel assemblies;

removing two remaining diagonally opposed fuel assemblies from the control cell;

lowering a lift tool into a control cell until a lower end of the lift tool is engaged with a fuel support piece;

moving a control rod grapple supported by the lift tool into engagement with a lifting handle of a control rod;

moving a fuel support piece grapple supported at a lower end of the lift tool into locking engagement with the fuel support piece;

moving a blade guide grapple supported by the tool into engagement with the blade guide; and raising the blade guide out of the control cell together with the lift tool, control rod and the fuel support piece, whereby the control rod and the fuel support piece are lifted out of the control cell together.

13. The method of moving a control rod assembly according to claim 12, further comprising the steps of:

moving an unlatching grapple supported on a lower end of the lift tool into engagement with an unlatching handle of the control rod; and raising the unlatching grapple along with the unlatching handle relative to a frame of the lift tool to unlatch the control rod from a control rod drive.

14. The method of moving a control rod assembly according to claim 12 further comprising the step of moving the control rod grapple along a length of a frame of the lift tool to selectively raise and lower the control rod within the control cell relative to the fuel support piece.

15. The method of moving a control rod assembly according to claim 12, wherein said step of moving the fuel support piece grapple into engagement with the fuel support piece comprises inserting a pair of tapered members at a lower end of the lift tool into two open holes of the fuel support piece, and moving a plurality of latches provided on the tapered members into locking engagement with the fuel support piece.

16. The method of moving a control rod assembly according to claim 12, further comprising the steps of suspending the lift tool from a lift cable connected to the control rod grapple, lowering the lift cable to lower the lift tool into the control cell, and continuing to lower the lift cable after a lower end of the lift tool engages the fuel support piece to thereby lower the control rod grapple from a first position near an upper end of the lift tool to a second position near a lower end of the lift tool.

17. The method of moving a control rod assembly according to claim 16, further comprising the steps of moving the control rod grapple into engagement with the lift handle of the control rod when the control rod grapple is at the second position near the lower end of the lift tool, and raising the lift cable relative to a frame of the lift tool to thereby raise the control rod grapple and control rod to the first position near the upper end of the lift tool.

* * * * *